United States Patent
Ibrahim et al.

(10) Patent No.: US 10,843,969 B2
(45) Date of Patent: Nov. 24, 2020

(54) ALKALI ACTIVATED NATURAL POZZOLAN BASED CONCRETE CONTAINING GROUND GRANULATED BLAST FURNACE SLAG

(71) Applicant: KING FAHD UNIVERSITY OF PETROLEUM AND MINERALS, Dhahran (SA)

(72) Inventors: Mohammed Ibrahim, Dhahran (SA); Hatim Dafalla Mohamed, Dhahran (SA); Mohammed Salihu Barry, Dhahran (SA); Luai M. Alhems, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 16/290,314

(22) Filed: Mar. 1, 2019

(65) Prior Publication Data
US 2020/0277230 A1     Sep. 3, 2020

(51) Int. Cl.
| | |
|---|---|
| *C04B 28/26* | (2006.01) |
| *C04B 22/06* | (2006.01) |
| *C04B 7/12* | (2006.01) |
| *C04B 7/153* | (2006.01) |
| *C04B 14/06* | (2006.01) |
| *C04B 14/28* | (2006.01) |
| *C04B 103/00* | (2006.01) |
| *C04B 103/14* | (2006.01) |
| *C04B 111/00* | (2006.01) |

(52) U.S. Cl.
CPC ............. *C04B 28/26* (2013.01); *C04B 7/12* (2013.01); *C04B 7/1535* (2013.01); *C04B 14/06* (2013.01); *C04B 14/28* (2013.01); *C04B 22/062* (2013.01); *C04B 2103/0006* (2013.01); *C04B 2103/0088* (2013.01); *C04B 2103/14* (2013.01); *C04B 2111/00224* (2013.01); *C04B 2201/52* (2013.01)

(58) Field of Classification Search
CPC ......... C04B 7/12; C04B 7/1535; C04B 14/06; C04B 14/28; C04B 22/062; C04B 28/26; C04B 2103/0006; C04B 2103/0088; C04B 2103/14; C04B 2111/00224; C04B 2201/52

See application file for complete search history.

(56) References Cited

U.S. PATENT DOCUMENTS

| | | | | |
|---|---|---|---|---|
| 7,267,720 | B2* | 9/2007 | Sadikovic | C04B 7/1535 106/624 |
| 7,631,692 | B2* | 12/2009 | Roddy | C04B 28/02 106/679 |
| 9,090,508 | B2* | 7/2015 | Gong | C04B 28/006 |
| 9,174,869 | B2* | 11/2015 | Guzzetta | C04B 28/02 |
| 9,266,775 | B2 | 2/2016 | Hesselbarth et al. | |
| 9,902,650 | B2 | 2/2018 | Guerini et al. | |
| 9,919,974 | B2* | 3/2018 | Gong | C04B 38/02 |

FOREIGN PATENT DOCUMENTS

| | | |
|---|---|---|
| CN | 102918002 B | 4/2016 |
| CN | 108298913 A | 7/2018 |
| WO | WO 2018/026711 A1 | 2/2018 |

OTHER PUBLICATIONS

R.A. Robayo, et al., "Natural pozzolan-and granulated blast furnace slag-based binary geopolymers" Materiales De Construcción, vol. 66, Issue 321, 2016, pp. 1-7.

K. Onoue, et al., "Optimization of alkali-activated mortar utilizing ground granulated blastfurnace slag and natural pozzolan from Germany with the dynamic approach of the Taguchi method" Construction and Building Materials, vol. 144, 2017, pp. 357-372.

* cited by examiner

*Primary Examiner* — Anthony J Green
(74) *Attorney, Agent, or Firm* — Oblon, McClelland, Maier & Neustadt, L.L.P.

(57) ABSTRACT

Alkali activated concrete compositions containing natural pozzolan, ground granulated blast furnace slag, alkali activators such as an alkali hydroxide and an alkali silicate, and optionally fine and coarse aggregates. Alkali activated concretes made therefrom and methods of making such concretes are also specified. The inclusion of ground granulated blast furnace slag provides significantly superior mechanical strength (e.g. compressive strength) to the alkali activated concretes within 12-24 hours of curing at 30-60° C.

20 Claims, 2 Drawing Sheets

ALKALI ACTIVATED NATURAL POZZOLAN BASED CONCRETE CONTAINING GROUND GRANULATED BLAST FURNACE SLAG

STATEMENT OF ACKNOWLEDGEMENT

This research work was supported by the Center for Engineering Research (CER) of Research Institute, King Fahd University of Petroleum and Minerals (KFUPM), Dhahran, Saudi Arabia.

BACKGROUND OF THE INVENTION

Technical Field

The present disclosure relates to an alkali activated concrete composition including natural pozzolan, ground granulated blast furnace slag, an alkali activator, and fine and coarse aggregates, alkali activated concretes made therefrom and methods for producing the composition and concretes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well established that global warming is caused by emission of greenhouse gases such as carbon dioxide ($CO_2$), nitrous oxide ($N_2O$), and methane ($CH_4$). Due to punitive measures imposed by international environmental agencies, efforts are being made by industries to limit greenhouse gas emissions into the atmosphere. The global demand for constructing new buildings and infrastructures is increasing with the growth in human population. Ordinary Portland Cement (OPC) is the primary building material being used to construct infrastructure that meets this increasing demand. Unfortunately, production of OPC leads to emission of greenhouse gases such as $CO_2$. Production of one ton of OPC generates approximately one ton of $CO_2$ via the thermal decomposition of calcium carbonate and energy requirements of the lime production process [P. K. Mehtha, *Reducing the Environmental Impact of Concrete*," ACI Concrete International, 23(10), pp. 61-66; and V. M. Malhotra, "Making Concrete Greener with Fly Ash," ACI Concrete International, 21, pp. 61-66]. Production of ordinary Portland cement (OPC) contributes about 6% to 7% of global $CO_2$ emissions. In order to reduce the usage of OPC, natural materials and industrial byproducts are being used as partial replacements. Research has shown that these materials tend to improve the quality of concrete [Maslehuddin, M., Al-Maria, A. I., Shamim, M., and Saricimen, H., "Corrosion of Reinforcing Steel in Concrete Containing Slag or Pozzolans," *ASTM Journal of Cement, Concrete and Aggregates*, Vol. 12, No. 1, 1990, pp. 24-31; Al-Amoudi, O. S. B., Rasheeduzzafar, Maslehuddin, M., and Al-Mana, A. I., "Prediction of Long-Term Corrosion Resistance of Plain and Blended Cement Concretes," *ACI Materials Journal*, Vol. 90, No. 6, November 1993, pp. 564-570; and Saricimen, H., Maslehuddin, M., Al-Tayyib, A. J., and Al-Mana, A. I., "Permeability and Durability of Plain and Blended Cement Concretes Cured in Field and Laboratory Conditions," *ACI Materials journal*, Vol. 9, No. 2, 1995, pp. 111-116, each incorporated herein by reference in their entirety]. As the need for more housing infrastructure increases, so too does the demand for other binder materials. The use of cement in the production of concrete is likely unavoidable in the foreseeable future, however it can be curtailed through the use of alternative binders.

The present disclosure relates to the development of novel green concrete utilizing natural pozzolan (NP) as a primary source material. In order to gain satisfactory strength of the concrete, natural pozzolan was partially replaced with ground granulated blast furnace slag (GGBFS), which is a by-product of steel manufacturing industry.

In view of the foregoing, one objective of the present disclosure is to provide an alkali activated concrete composition comprising natural pozzolan, ground granulated blast furnace slag, and alkali activators. A further objective of the present disclosure is to provide alkali activated concretes based on said concrete compositions and to provide methods for making said alkali activated concretes.

BRIEF SUMMARY OF THE INVENTION

According to a first aspect, the present disclosure relates to an alkali activated concrete composition containing a natural pozzolan, a ground granulated blast furnace slag, and an alkali activator involving an alkali hydroxide and an alkali silicate, wherein the natural pozzolan comprises 35-50 wt % of $SiO_2$, 10-25 wt % of $Fe_2O_3$, 5-15 wt % of $Al_2O_3$, and 8-15 wt % of CaO, each relative to a total weight of the natural pozzolan, the ground granulated blast furnace slag comprises 30-35 wt % of $SiO_2$, 0.5-5 wt % of $Fe_2O_3$, 10 to 12 wt % of $Al_2O_3$, and 40-50 wt % of CaO, each relative to a total weight of the ground granulated blast furnace slag, a weight ratio of the natural pozzolan to the ground granulated blast furnace slag is in a range of 1:1 to 20:1, a weight ratio of the alkali silicate to the alkali hydroxide is in a range of 2:1 to 3:1, and the alkali activated concrete composition is devoid of fly ash.

In one embodiment, the alkali hydroxide is sodium hydroxide.

In one embodiment, the alkali silicate is sodium silicate.

In one embodiment, the alkali activated concrete composition further comprises a fine aggregate and a coarse aggregate.

In one embodiment, the fine aggregate comprises sand having a specific gravity of 2.2-3.2.

In one embodiment, the coarse aggregate comprises crushed limestone having a specific gravity of 2.1-3.0.

In one embodiment, the weight ratio of the natural pozzolan to the ground granulated blast furnace slag is in a range of 1:1 to 4:1.

In one embodiment, the weight ratio of the alkali silicate to the alkali hydroxide is in a range of 2.4:1 to 2.7:1.

In one embodiment, the alkali activated concrete composition has a weight percentage of the natural pozzolan ranging from 8-20% relative to a total weight of the alkali activated concrete composition.

In one embodiment, the alkali activated concrete composition has a weight percentage of the ground granulated blast furnace slag ranging from 0.4-15% relative to a total weight of the alkali activated concrete composition.

In one embodiment, the alkali activated concrete composition has a weight percentage of the alkali silicate ranging from 5-10% relative to a total weight of the alkali activated concrete composition.

In one embodiment, the alkali activated concrete composition has a weight percentage of the alkali hydroxide ranging from 1.5-5% relative to a total weight of the alkali activated concrete composition.

In one embodiment, a weight ratio of the coarse aggregate to the fine aggregate is in a range of 3:1 to 1:1.

In one embodiment, the alkali activated concrete composition consists essentially of (i) the natural pozzolan, (ii) the ground granulated blast furnace slag, (iii) the alkali hydroxide, (iv) the alkali silicate, (v) the fine aggregate, and (vi) the coarse aggregate, wherein a weight ratio of the natural pozzolan to the ground granulated blast furnace slag is in a range of 1:1 to 20:1, and a weight ratio of the alkali silicate to the alkali hydroxide is in a range of 2:1 to 3:1.

According to a second embodiment, the present disclosure relates to a wet concrete slurry involving the alkali activated concrete composition of the first aspect and water, wherein a weight ratio of the water to the alkali activated concrete composition is in a range of 1:5 to 1:25.

According to a third aspect, the present disclosure relates to an alkali activated concrete involving the wet concrete slurry of the second aspect in a cured form.

In one embodiment, the alkali activated concrete has a 24-hour unit weight of 2,100-2,400 kg/m$^3$ as determined by ASTM C138.

In one embodiment, the alkali activated concrete has a 12-hour compressive strength of 25-70 MPa as determined by ASTM C109 when cured at a temperature ranging from 30-60° C.

According to a fourth aspect, the present disclosure relates to a method of producing the alkali activated concrete of the third aspect. The method involves the steps of casting the wet concrete slurry in a mold to faint a casted wet concrete, and curing the casted wet concrete for 0.5-30 days thereby forming the alkali activated concrete.

According to a fifth aspect, the present disclosure relates to a two-component concrete kit involving a concrete package containing a natural pozzolan, a ground granulated blast furnace slag, a fine aggregate comprising sand, and a coarse aggregate comprising crushed limestone, and an alkali package comprising an alkali hydroxide and an alkali silicate, wherein the natural pozzolan comprises 35-50 wt % of $SiO_2$, 10-25 wt % of $Fe_2O_3$, 5-15 wt % of $Al_2O_3$, and 8-15 wt % of CaO, each relative to a total weight of the natural pozzolan, the ground granulated blast furnace slag comprises 30-35 wt % of $SiO_2$, 0.5-5 wt % of $Fe_2O_3$, 10 to 12 wt % of $Al_2O_3$, and 40-50 wt % of CaO, each relative to a total weight of the ground granulated blast furnace slag, a weight ratio of the natural pozzolan to the ground granulated blast furnace slag is in a range of 1:1 to 20:1, and a weight ratio of the alkali silicate to the alkali hydroxide is in a range of 2:1 to 3:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
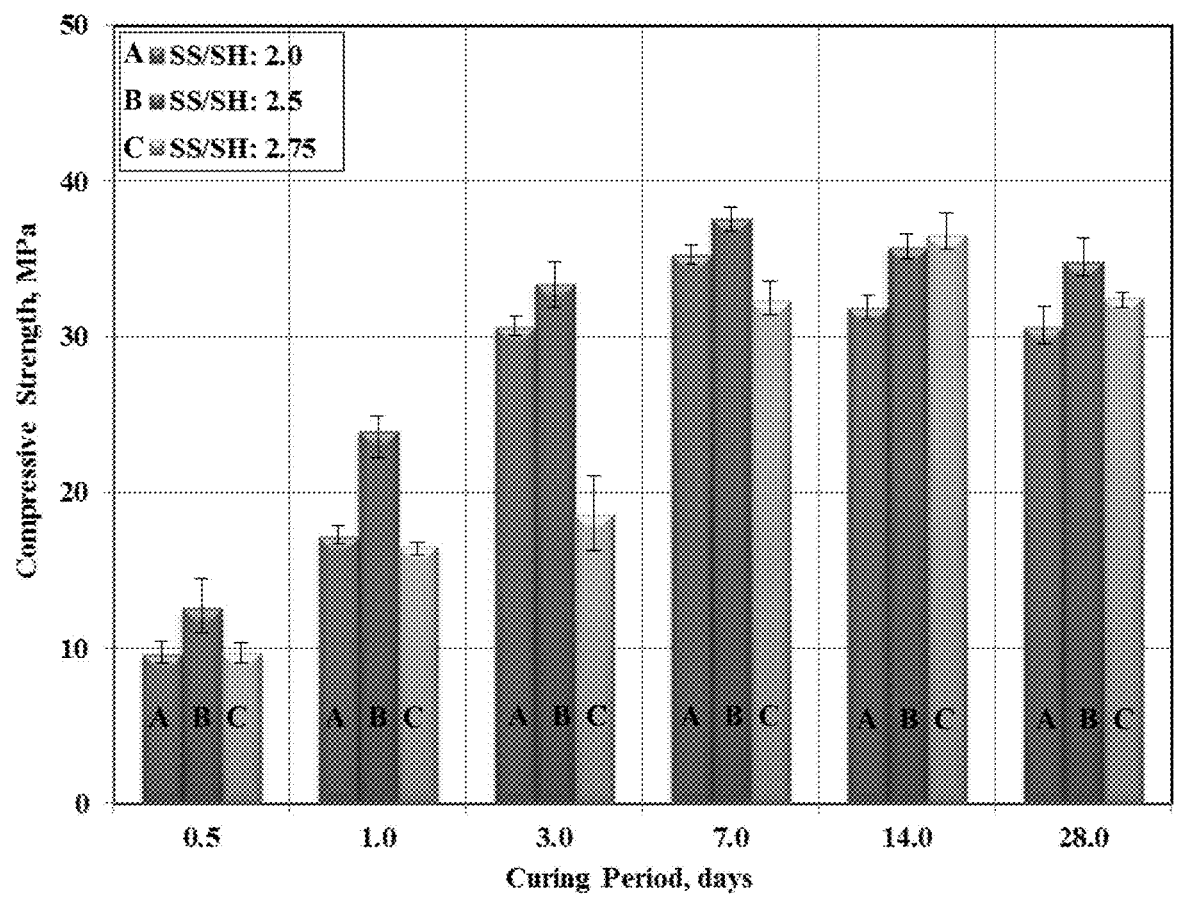
FIG. 1 is a bar graph summarizing compressive strength of alkali activated concretes having a weight ratio of sodium silicate to sodium hydroxide at 2 (A), 2.5 (B), and 2.75 (C), respectively, cured for 0.5, 1, 3, 7, 14, and 28 days.

Embodiments of the present disclosure will now be described more fully hereinafter with reference to the accompanying drawings, in which some, but not all embodiments of the disclosure are shown.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the words "substantially similar", "substantially identical", "approximately", or "about" unless otherwise specified may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), or ±15% of the stated value (or range of values).

According to a first aspect, the present disclosure relates to an alkali activated concrete composition containing a natural pozzolan, a ground granulated blast furnace slag, and an alkali activator involving an alkali hydroxide and an alkali silicate. In one or more embodiments, the alkali activated concrete composition disclosed herein further comprises a fine aggregate and a coarse aggregate. The alkali activated concrete composition disclosed herein refers to a dry, un-hydrated composition, and all recited weight ratios related to the composition are based on the dry composition. A wet concrete slurry described in the second aspect of the present disclosure may be formed once water is added to the alkali activated concrete composition.

In the past decade or so, alkali activated concrete (AAC), also termed as green concrete, is emerging as a viable alternative to OPC, due to its excellent mechanical properties and lower environmental impact. AAC may be developed by replacing OPC with industrial byproducts rich in alumina and/or silica in the presence of alkaline solutions [J. Davidovits, "Global Warming Impact on the Cement and Aggregates Industries," World Resource Review, vol. 6, no. 2, pp. 263-278, 1994; and J Davidovits, "Chemistry of Geopolymeric Systems Terminology," *Paper Presented at Geopolymer 99, international Conference*, Saint Quentin, France, 1999, each incorporated herein by reference in their entirety]. So far, fly ash has been utilized extensively in producing AAC.

As used herein, natural pozzolans are siliceous or aluminosiliceous materials such as volcanic ashes, calcined clays, and shale. Pozzolans may react chemically with alkali hydroxide (e.g. calcium hydroxide) to form compounds (e.g. calcium silicate hydrates) possessing cementitious properties. Natural pozzolans may be used as an alternative cementitious material to develop alkali activated concrete (AAC). Natural pozzolan is available in many parts of the world, including a 100,000 km² area in Saudi Arabia along the Red Sea coast [M. R. Moufti, A. A. Sabtan, O. R. El-Mandy and W. M. Shehata, "Preliminary Geologic and Engineering Assessment of the Pyroclastic Deposits in the Central Part of Harrat Rahat," *Journal of King Abdul Aziz University, Earth Sciences*, Vol. 11. pp. 59-88, 1999, incorporated herein by reference in its entirety].

In a preferred embodiment, grounded basalt rock collected from the Saudi Arabia Red Sea coast is used herein as natural pozzolan. Basalt is a mafic extrusive igneous rock formed from the rapid cooling of magnesium-rich and iron-rich lava exposed to or very near the surface of a terrestrial planet or a moon. More than 90% of all volcanic rock on earth is basalt. The grounded basalt rock used herein as the natural pozzolan may differ from typical natural pozzolans (e.g. volcanic ash) collected from other sources by having a relatively low content of $SiO_2$ and a high content of $Fe_2O_3$. In general, typical natural pozzolans including basaltic rock from other locations (e.g. Columbia, Germany, Egypt) may contain up to 55 wt % of $SiO_2$, preferably up to 57 wt %, preferably up to 60 wt %, preferably up to 62 wt % of $SiO_2$ relative to a total weight of the natural pozzolan from other locations. In one or more embodiments, the natural pozzolan used herein (e.g. grounded basalt rock collected from the Saudi Arabia Red Sea coast) comprises 35-50 wt % of $SiO_2$, preferably 37-45 wt % of $SiO_2$, more preferably 39-42 wt % of $SiO_2$, or about 40.5 wt % of $SiO_2$ relative to a total weight of the natural pozzolan. In at least one embodiment, the amount of $SiO_2$ present in the natural pozzolan used herein is less than 55 wt %, preferably less than 54 wt %, preferably less than 52 wt % relative to a total weight of the natural pozzolan. Additionally, natural pozzolans including basaltic rock from other locations (e.g. Columbia, Germany, Egypt) may contain less than 12 wt % of $Fe_2O_3$, preferably less than 10 wt %, preferably less than 8 wt %, preferably less than 6 wt % of $Fe_2O_3$ relative to a total weight of the natural pozzolan from other locations. In one or more embodiments, the natural pozzolan used herein (e.g. grounded basalt rock collected from the Saudi Arabia Red Sea coast) comprises 10-25 wt % of $Fe_2O_3$, preferably 13-22 wt % of $Fe_2O_3$, more preferably 15-19 wt % of $Fe_2O_3$, or about 17.5 wt % of $Fe_2O_3$ relative to a total weight of the natural pozzolan. In at least one embodiment, the amount of $Fe_2O_3$ present in the natural pozzolan used herein is greater than 10 wt %, preferably greater than 12 wt %, preferably greater than 15 wt % relative to a total weight of the natural pozzolan.

In a related embodiment, the natural pozzolan used herein comprises 8-18 wt % of CaO, preferably 9-15 wt %, more preferably 10-13 wt %, or about 11.8 wt % relative to a total weight of the natural pozzolan. In at least one embodiment, the amount of CaO present in the natural pozzolan is greater than 5 wt %, preferably greater than 6 wt %, preferably greater than 7 wt % relative to a total weight of the natural pozzolan. In another related embodiment, the natural pozzolan used herein comprises 5-20 wt % of $Al_2O_3$, preferably 8-18 wt % of $Al_2O_3$, more preferably 10-15 wt % of $Al_2O_3$, or about 13 wt % of $Al_2O_3$ relative to a total weight of the natural pozzolan (see Table 1). In at least one embodiment, the natural pozzolan used herein may comprise substantially no sulfate, for instance, less than 0.1 wt % of sulfate, preferably less than 0.05 wt %, more preferably less than 0.01 wt % of sulfate, relative to a total weight of the natural pozzolan. In at least one embodiment, the natural pozzolan used herein is devoid of sulfate. The oxide compositions of natural pozzolan collected from different sources may differ significantly. For instance, the following Table 6 compares the oxide compositions of currently used natural pozzolan (NP) with those collected from three different sources, namely Iran, Germany, and Colombia.

TABLE 6

Comparison of oxide compositions of natural pozzolan (NP) of different origins

| Component | NP used in the current disclosure | NP of Colombian origin | NP of German origin | NP of Iranian origin |
|---|---|---|---|---|
| $SiO_2$ | 40.48% | 61.17% | 57.1% | 61.67% |
| $Al_2O_3$ | 12.90% | 16.57% | 16.90% | 15.90% |
| $Fe_2O_3$ | 17.62% | 5.81% | 6.10% | 4.32% |
| CaO | 11.83% | 2.86% | 4.90% | 7.99% |

The particle size and amorphousness of a pozzolan may impact its pozzolan reactivity. In one or more embodiments, the natural pozzolan used herein has a particle size in a range of 0.1-100 μm, preferably 0.5-80 μm, preferably 1-60 μm, preferably 5-40 μm, preferably 10-20 μm. The amorphous character of the pozzolans may be determined by X-ray diffraction (XRD), and transmission electron microscopy (TEM). In some embodiments, the natural pozzolan used herein contains amorphous silica, amorphous alumina, and/or amorphous iron oxide.

In one or more embodiments, the alkali activated concrete composition has a weight percentage of the natural pozzolan ranging from 8-20% relative to a total weight of the composition, preferably 9-19%, preferably 10-18%, preferably 11-17%, preferably 12-16% relative to the total weight of the alkali activated concrete composition.

Slag is the glass-like by-product left over after a desired metal has been separated (i.e., smelted) from its raw ore. Blast furnace slag is a by-product obtained during the production (e.g. quenching) of metal products and objects including iron, copper, brass, and others. As used herein, a ground granulated blast furnace slag (GGBFS) may be obtained by quenching molten iron slag (a by-product of iron and steel-making) from a blast furnace in water or steam, to produce a glassy, granular product that is then dried and ground into a fine powder. GGBFS used herein may be amorphous having an amorphous phase content of 20-75%, 25-70%, 30-65%, 35-60%, 40-55%, or 45-50%. The quantification of amorphous phase may be performed by XRD using different methods such as single peak method, and whole powder pattern method. GGBFS generally have a Blaine fineness value in a range of 320-530 m²/kg, 350-500 m²/kg, or 380-450 m²/kg. GGBFS typically contains elevated concentrations of calcium oxide, silicon dioxide, and aluminum. In one embodiment, GGBFS used herein comprises 25-45 wt % of $SiO_2$, preferably 28-40 wt % of $SiO_2$, more preferably 30-35 wt % of SiO relative to a total weight of the GGBFS. In a related embodiment, GGBFS used herein comprises 0.5-5 wt % of $Fe_2O_3$, preferably 1-4 wt % of $Fe_2O_3$, more preferably 2-3 wt % of $Fe_2O_3$ relative to a total weight of the GGBFS. In another related embodiment, GGBFS used herein comprises 6-20 wt % of $Al_2O_3$, preferably 8-15 wt % of $Al_2O_3$, more preferably 10-12 wt % of $Al_2O_3$ relative to a total weight of the GGBFS. In another related embodiment, GGBFS used herein comprises 30-55 wt % of CaO, preferably 35-50 wt % of CaO, more preferably 42-48 wt % of CaO relative to a total weight of the GGBFS.

In one or more embodiments, the alkali activated concrete composition has a weight percentage of the ground granulated blast furnace slag ranging from 0.4-15% relative to a total weight of the composition, preferably 1-12%, preferably 2-10%, preferably 4-8%, preferably 6-7% relative to the total weight of the alkali activated concrete composition.

The strength development of alkali activated concrete (AAC) relies on factors including curing temperature, concentrations of alkaline materials, as well as chemical composition and fineness of precursor materials. Among these factors, a chemical composition having sufficient quantities of minerals such as $SiO_2$, $Al_2O_3$ and CaO is crucial for robust AACs. However, natural pozzolans from the sources mentioned (e.g. Saudi Arabia) may not contain adequate amounts of these oxides. Durable AAC may be produced from natural pozzolans via fortification with a mineral-rich material to optimize the chemical composition. The alkali activated concrete composition disclosed herein utilizes the aforementioned natural pozzolan and ground granulated blast furnace slag for improved strength. In one or more embodiments, a weight ratio of the natural pozzolan to the ground granulated blast furnace slag is in a range of 1:1 to 20:1, preferably 2:1 to 18:1, preferably 3:1 to 16:1, preferably 4:1 to 15:1, preferably 5:1 to 14:1, preferably 6:1 to 13:1, preferably 7:1 to 12:1, preferably 8:1 to 11:1, preferably 9:1 to 10:1. In a most preferred embodiment, the weight ratio of the natural pozzolan to the ground granulated blast furnace slag is in a range of 1:1 to 4:1, 1:1.5 to 3:1, or 2:1 to 2.5:1.

Alkali activated materials may be synthesized via chemical reactions of mineral powder rich in alumina, silica and/or calcium that becomes soluble in alkali activator solutions. The formation of cementitious material may be based on heterogeneous reactions involving reactive aluminosilicate rich materials under alkaline conditions that yield sodium aluminosilicate glass.

Exemplary alkali hydroxides include, but are not limited to, sodium hydroxide, potassium hydroxide, lithium hydroxide, rubidium hydroxide, cesium hydroxide, and mixtures thereof. In a preferred embodiment, the alkali hydroxide of the present disclosure is sodium hydroxide. It is equally envisaged that the currently disclosed alkali activated concrete may be adapted to include other metal hydroxides such as calcium hydroxide, magnesium hydroxide, strontium hydroxide, and barium hydroxide. Alternatively, carbonates such as sodium carbonate and potassium carbonate may be used in addition to, or in lieu of the hydroxides. In a preferred embodiment, the alkali activated concrete composition has a weight percentage of the alkali hydroxide ranging from 1-5% relative to a total weight of the composition, preferably 1.5-4%, preferably 1.8-3.5%, preferably 2-3%, preferably 2.2-2.5% relative to the total weight of the alkali activated concrete composition.

Exemplary alkali silicates include, but are not limited to, sodium silicate, potassium silicate, lithium silicate, and mixtures thereof. In a preferred embodiment, the alkali silicate of the present disclosure is sodium silicate. Sodium silicate is a generic name for a family of chemical compounds with a formula $mSiO_2 \cdot nNa_2O$ where a silica modulus (i.e. molar ratio of $SiO_2$ to $Na_2O$, or m:n) is in a range from 0.5 to 3.6, preferably from 1 to 3.5, preferably from 2 to 3.4, preferably from 3 to 3.35, or about 3.3. Non-limiting examples of sodium silicate include sodium metasilicate ($Na_2SiO_3$), sodium metasilicate pentahydrate ($Na_2SiO_3 \cdot 5H_2O$), sodium metasilicate nonahydrate ($Na_2SiO_3 \cdot 9H_2O$), sodium orthosilicate ($Na_4SiO_4$), and sodium pyrosilicate ($Na_6Si_2O_7$). In a preferred embodiment, the alkali activated concrete composition has a weight percentage of the alkali silicate ranging from 4-10% relative to a total weight of the composition, preferably 4.5-9%, preferably 5-8%, preferably 5.5-7%, preferably 6-6.5% relative to the total weight of the alkali activated concrete composition.

In one or more embodiments, a weight ratio of the aforementioned alkali silicate to the alkali hydroxide is in a range of 2:1 to 3:1, preferably 2.1:1 to 2.9:1, preferably 2.2:1 to 2.8:1, preferably 2.3:1 to 2.7:1, preferably 2.4:1 to 2.6:1, or about 2.5:1. The alkali activator involving the alkali silicate and the alkali hydroxide may be incorporated as an aqueous solution, dry powder (anhydrous), or as a combination of both. Amounts of the alkali activator described herein are calculated as dry content. Aqueous alkali activator may be obtained as a commercial product or by mixing water with the dry alkali activator.

The alkali activated concrete composition of the present disclosure may comprise aggregates. As used herein, "construction aggregate" or simply "aggregate" refers to a broad category of particulate material used in construction. Aggregates are a component of composite materials such as concrete; the aggregates serve as reinforcement to add strength to the overall composite material. Aggregates, from different sources, or produced by different methods, may differ considerably in particle shape, size and texture. Shape of the aggregates of the present disclosure may be cubical and reasonably regular, essentially rounded, angular, or irregular. Surface texture may range from relatively smooth with small exposed pores to irregular with small to large exposed pores. Particle shape and surface texture of both fine and coarse aggregates may influence proportioning of mixtures in such factors as workability, pumpability, fine-to-coarse aggregate ratio, and water requirement.

In one or more embodiments, the alkali activated concrete composition of the present disclosure comprises a fine aggregate. In one embodiment, the fine aggregate used herein has an average particle size in a range of 0.05-1 mm, preferably 0.1-0.8 nm, preferably 0.2-0.6 mm, preferably 0.3-0.5 mm. In a preferred embodiment, the fine aggregate used herein has a specific gravity of 2.0-3.5, preferably 2.2-3.2, preferably 2.4-3.0, preferably 2.6-2.8. As used herein, water absorption refers to the penetration of water into aggregate particles with resulting increase in particle weight. In one embodiment, the alkali activated concrete composition of the present disclosure comprises a fine aggregate having a water absorption of 0.1-1.0%, preferably 0.2-0.8%, preferably 0.4-0.6%. In a preferred embodiment, the alkali activated concrete composition has a weight percentage of the fine aggregate ranging from 15-35% relative to the total weight of the composition, preferably 18-32%, preferably 20-30%, preferably 22-28%, preferably 24-26% relative to the total weight of the alkali activated concrete composition.

In a preferred embodiment, the fine aggregate is sand, more preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In teslas of particle size, sand particles range in diameter from 0.0625 mm to 2 mm. An individual particle in this range is term sand grain. By definition sand grains are between gravel (particles ranging from 2 mm to 64 mm) and silt (particles ranging from 0.004 mm to 0.0625 mm). In a most preferred embodiment, the fine aggregate of the alkali activated concrete composition is dune sand with a specific gravity of 2.2-3.2, preferably 2.4-3.0, more preferably 2.5-2.7, or about 2.6.

In one or more embodiments, the alkali activated concrete composition of the present disclosure comprises a coarse aggregate. In one embodiment, the coarse aggregate used herein has an average particle size in a range of 2-20 mm, preferably 4-15 mm, preferably 6-13 mm, preferably 8-12 mm. In a preferred embodiment, the coarse aggregate used herein has a specific gravity of 2.0-3.0, preferably 2.2-2.9, preferably 2.4-2.8, preferably 2.5-2.7. In one embodiment, the concrete composition of the present disclosure comprises a coarse aggregate having a water absorption of 0.4-4.0%, preferably 0.6-2.0%, preferably 0.8-1.5%. In a preferred embodiment, the concrete composition has a weight percentage of the coarse aggregate ranging from 35-65% relative to the total weight of the composition, preferably 38-60%, preferably 40-55%, preferably 42-50%, preferably 45-48% relative to the total weight of the concrete composition.

In a preferred embodiment, the course aggregate present in the concrete composition is crushed limestone. As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. Crushed limestone is generated during the crushing and grinding of limestone rocks. The crushed limestone used herein may have an average particle size greater than 1 mm. In one embodiment, the crushed limestone has an average particle size of 1.5-32 mm, preferably 2-30 mm, preferably 4-28 mm, preferably 6-24 mm, preferably 8-20 mm, preferably 10-18 mm, preferably 12-16 mm. The crushed limestone may contain materials including, but not limited to, calcium carbonate, silicon dioxide, quartz, feldspar, clay minerals, pyrite, siderite, chert and other minerals. In a most preferred embodiment, the coarse aggregate of the alkali activated concrete composition is crushed limestone with a specific gravity of 2.1-3.0, preferably 2.2-2.8, more preferably 2.4-2.7, or about 2.56.

It is equally envisaged that the alkali activated concrete composition of the present disclosure may be adapted to comprise other coarse aggregates. Exemplary coarse aggregates that may be used in addition to, or in lieu of crushed limestone include, but are not limited to, natural coarse aggregates such as scoria, perlite, vermiculite, diatomite, schists, expanded schist and the like and mixtures thereof, and synthetic coarse aggregates comprising polymers such as polypropylene polyethylene, polystyrene, polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like and copolymers and mixtures thereof.

In one or more embodiments, a weight ratio of the aforementioned coarse aggregate to the fine aggregate is in a range of 3:1 to 1:1, preferably 2.5:1 to 1.2:1, preferably 2:1 to 1.5:1, or about 1.86:1. However, in certain embodiments, the weight ratio of the coarse aggregate to the fine aggregate may be less than 1:1 or greater than 3:1.

As used herein, a "plasticizer" is an additive that increases the plasticity or fluidity of slurry. Plasticizers increase the workability of "fresh" concrete, allowing it to be placed more easily, with less consolidating effort. A superplasticizer is a plasticizer with fewer deleterious effects. A "superplasticizer" refers a chemical admixture used herein to provide a well-dispersed particle suspension in the wet concrete slurry. The superplasticizer may be used to prevent particle segregation and to improve the flow characteristics of the wet concrete slurry. The superplasticizer may be a polycarboxylate, e.g. a polycarboxylate derivative with polyethylene oxide side chains, a polycarboxylate ether (PCE) superplasticizer, such as the commercially available Glenium 5I®. Polycarboxylate ether-based superplasticizers may allow a significant water reduction at a relatively low dosage, thereby providing good particle dispersion in the wet concrete slurry. Polycarboxylate ether-based superplasticizers are composed of a methoxy-polyethylene glycol copolymer (side chain) grafted with methacrylic acid copolymer (main chain) Exemplary superplasticizers that may be used in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

In one embodiment, the alkali activated concrete composition disclosed herein also comprises a superplasticizer. In a preferred embodiment, the alkali activated concrete composition has a weight percentage of the superplasticizer ranging from 0.1-3.0% relative to the total weight of the composition, preferably 0.2-2.5%, preferably 0.5-2.0%, preferably 1.0-1.8%, preferably 1.2-1.6%, or about 1.5% relative to the total weight of the alkali activated concrete composition.

Fly ash is a byproduct generated during the burning of pulverized coal in electric power plants. Fly ash generally contains $SiO_2$, $Al_2O_3$, $Fe_2O_3$ and $CaO$. Depending upon the specific coal bed composition, other constituents of fly ash may include arsenic, beryllium, boron, cadmium, chromium, hexavalent chromium, cobalt, lead, manganese, mercury, molybdenum, selenium, strontium, thallium, vanadium, dioxins, PAH compounds and unburnt carbon. Differences between utilizing natural pozzolans and fly ash as cementitious material may be recognized by different fineness values, drying shrinkage, loss on ignition, as well as reactivity with cement alkalis. In some embodiments, the alkali activated concrete composition described herein may comprise substantially no fly ash, for instance, less than 0.1 wt % of fly ash, preferably less than 0.05 wt %, more preferably less than 0.01 wt % of fly ash, relative to a total weight of the composition. In at least one embodiment, the alkali activated concrete composition described herein is devoid of fly ash.

Portland cement is a basic ingredient of concrete, mortar, stucco, and/or non-specialty grout. Portland cement may be present as a fine powder and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). In some embodiments, the alkali activated concrete composition described herein may comprise substantially no Portland cement, for instance, less than 0.1 wt % of Portland cement, preferably less than 0.05 wt %, more preferably less than 0.01 wt % of Portland cement, relative to a total weight of the composition. In at least one embodiment, the alkali activated concrete composition described herein is devoid of Portland cement.

In a preferred embodiment, the alkali activated concrete composition consists essentially of the natural pozzolan, the ground granulated blast furnace slag, the alkali hydroxide, the alkali silicate, sand as the fine aggregate, and crushed limestone as the coarse aggregate. In a related embodiment, a weight ratio of the natural pozzolan to the ground granulated blast furnace slag is in a range of 1:1 to 20:1, preferably 2:1 to 18:1, preferably 3:1 to 16:1, preferably 4:1 to 15:1, preferably 5:1 to 14:1, preferably 6:1 to 13:1, preferably 7:1 to 12:1, preferably 8:1 to 11:1, preferably 9:1 to 10:1. In another related embodiment, a weight ratio of the alkali silicate to the alkali hydroxide is in a range of 2:1 to 3:1, preferably 2.1:1 to 2.9:1, preferably 2.2:1 to 2.8:1, preferably 2.3:1 to 2.7:1, preferably 2.4:1 to 2.6:1, or about 2.5:1.

According to another embodiment, the present disclosure relates to a wet concrete slurry involving the alkali activated concrete composition disclosed herein in any of its embodiments, and water. The water may be potable water, tap water, freshwater or seawater, and may be taken from a natural source, such as an aquifer, lake, or ocean, and may be filtered to remove large solids before using. In one or more embodiments, a weight ratio of the water to the alkali activated concrete composition is in a range of 1:5 to 1:25, preferably 1:6 to 1:23, preferably 1:7 to 1:20, preferably 1:8 to 1:18, preferably 1:9 to 1:16, preferably 1:10 to 1:15, preferably 1:12 to 1:14. In general, the amount of water used in the wet concrete slurry depends upon the type of cementitious materials selected and the job conditions at hand. Thus, in other embodiments, the weight ratio of the water to the alkali activated concrete composition is less than 1:5 or greater than 1:25. The amount of water used may vary over a wide range, depending upon factors such as the chemical identity of the cementitious materials (e.g. natural pozzolan, GGBFS) and the required consistency of the wet concrete slurry.

According to another aspect, the present disclosure relates to an alkali activated concrete involving a cured form of the wet concrete slurry disclosed herein in any of its embodiments as well as a method of making the alkali activated concrete.

The alkali activated concrete may be made by sequentially pouring different components into a concrete mixer (e.g. a paddle mixer, a drum mixer, a rotating mixer, a stand mixer). For example, the aforementioned alkali activated concrete composition including the natural pozzolan, the ground granulated blast furnace slag, the fine aggregate, and the coarse aggregate may be dry-mixed in a concrete mixer for a time period ranging from 30 seconds-30 minutes, 60 seconds-20 minutes, or 3-10 minutes. Preferably, mixing the natural pozzolan, the ground granulated blast furnace slag, the fine aggregate, and the coarse aggregate forms a homogeneous dry mixture.

Following the dry mixing process, an alkali activator solution comprising the alkali hydroxide and the alkali silicate dissolved in water may be added to the dry mixture to form a wet concrete slurry. The alkali activator solution may be slowly poured into the concrete mixer while the concrete mixer turns the dry mixture for a time period ranging from 1-10 minutes, 2-8 minutes, or 3-6 minutes thereby forming a wet concrete mixture. Preferably, the alkali activator solution is mixed into the dry mixture for a time period of about 3 minutes. Alternatively, the alkali hydroxide and the alkali silicate may be dry-mixed in the aforementioned steps to form a dry mixture, and water may be added to the dry mixture containing the alkali activator to form the wet concrete slurry.

The wet concrete slurry containing the natural pozzolan, the ground granulated blast furnace slag, the fine aggregate, the coarse aggregate, water, the alkali hydroxide, and the alkali silicate may be then casted into a mold at a temperature of 10-40° C., preferably 15-35° C., more preferably 20-27° C. thereby forming a casted wet concrete. The wet concrete slurry may be compacted in the mold by using a steel rod or a trowel. In one embodiment, the casted wet concrete may be cured for a time period of 2-48 hours, 6-36 hours, or 12-24 hours and then removed from the mold, which results in an alkali activated concrete.

The alkali activated concrete may be left to further cure for a length of time necessary to achieve a desired mechanical property, such as a desired compressive strength. Preferably the alkali activated concrete, left to cure, will harden with a mechanical strength (e.g. compressive strength or tensile strength) that increases over the curing time. However, a strength will reach a maximum value within a certain time of curing, for example, within 28 days, preferably within 14 days, preferably within 7 days, preferably within 5 days. In one embodiment, the alkali activated concrete may be left to further cure for a time period of 0.5-30 days, preferably 1-28 days, more preferably 3-21 days, most preferably 7-14 days, though in certain embodiments, the alkali activated concrete may be considered cured in less than 0.5 day or after 30 days. The alkali activated concrete may be further cured at a temperature of 30-80° C., 40-70° C., or 50-60° C. Methods of preparing and curing wet concrete slurries are generally known to those skilled in the art.

As used herein, a unit weight (also known as "specific weight") is the weight per unit volume of a material. In one or more embodiments, the alkali activated concrete described herein has a unit weight of 2,000-2,500 kg/m$^3$, preferably 2,100-2,400 kg/m$^3$, preferably 2,150-2,300 kg/m$^3$, preferably 2,200-2,280 kg/m$^3$, preferably 2,240-2,260 kg/m$^3$. However, in certain embodiments, the alkali activated concrete may have a unit weight smaller than 2,000 kg/m$^3$, or greater than 2,500 kg/m$^3$. In one embodiment, the unit weight of the alkali activated concrete is determined by ASTM C138.

As defined herein, compressive strength is the capacity of a material or structure to withstand compressive loads, as opposed to tensile strength, which is the capacity of a material or structure to withstand tensile loads. In one embodiment, the compressive strength of the alkali activated concrete is determined by ASTM C109. In one or more embodiments, the alkali activated concrete described herein has an early-stage compressive strength of 25-80 MPa, preferably 30-70 MPa, preferably 35-65 MPa, preferably 40-60 MPa, preferably 45-55 MPa determined after further curing for 6-24 hours, 8-16 hours, or about 12 hours. In one or more embodiments, the alkali activated concrete described herein has a late-stage compressive strength of 35-80 MPa, preferably 40-75 MPa, preferably 45-70 MPa, preferably 50-65 MPa determined after further curing for 2-30 days, 3-28 days, 5-21 days, or 7-14 days.

Figure 2:
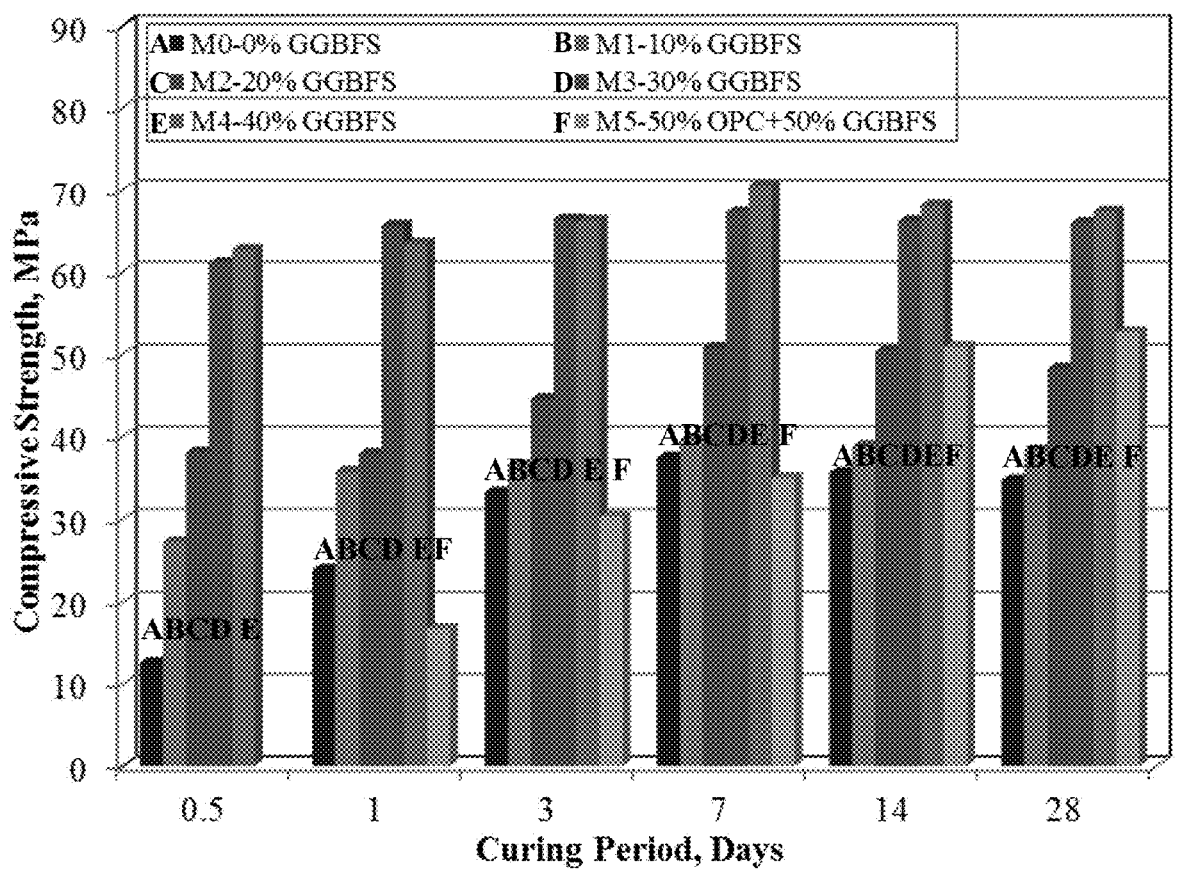
FIG. 2 is a bar graph summarizing compressive strength of alkali activated concretes M0, M1, M2, M3, M4, and M5 (refer to tables 3 and 4 for the abbreviation key) having different amounts of ground granulated blast furnace slag cured for 0.5, 1, 3, 7, 14, and 28 days at 60° C.

In a preferred embodiment, the alkali activated concrete of the present disclosure in any of its embodiments has an early-stage compressive strength that is up to 40% greater than that of a substantially identical concrete not formed with the ground granulated blast furnace slag determined after further curing for 6-24 hours, 8-16 hours, or about 12 hours, preferably up to 60%, preferably up to 80%, preferably up to 100?, preferably up to 200%, preferably up to 300%, preferably up to 400?, preferably up to 500% greater than that of the substantially identical concrete not formed with the ground granulated blast furnace slag, determined after further curing for 6-24 hours, 8-16 hours, or about 12 hours (see FIG. 2). In a preferred embodiment, the alkali activated concrete of the present disclosure in any of its embodiments has a late-stage compressive strength that is up to 5% greater than the that of a substantially identical concrete not formed with the ground granulated blast furnace slag determined after further curing for 2-30 days, 3-28 days, 5-21 days, or 7-14 days, preferably up to 8%, preferably up to 10%, preferably up to 20%, preferably up to 30%, preferably up to 40%, preferably up to 50%, preferably up to 75% greater than that of the substantially identical concrete not formed with the ground granulated blast furnace slag determined after further curing for 2-30 days, 3-28 days, 5-21 days, or 7-14 days (see FIG. 2), Here, the substantially identical concrete not formed with the ground granulated blast furnace slag may refer to a concrete cured by a wet concrete mixture comprising the natural pozzolan, the fine and coarse aggregates, the alkali hydroxide, the alkali silicate, and water, each present in relative weight percentages substantially similar to those in the aforementioned wet concrete slurry.

According to a further aspect, the present disclosure relates to a two-component concrete kit involving a concrete package and an alkali package. The concrete package comprises a natural pozzolan, a ground granulated blast furnace slag, a fine aggregate comprising sand, and a coarse aggregate comprising crushed limestone. The concrete and alkali packages may be packed individually and physically separated prior to usage. The method of using the two-component concrete kit to make an alkali activated concrete may be similar to aforementioned steps starting from mixing the components in the concrete and alkali packages to form a homogeneous dry mixture.

The chemical composition and physical properties of each component of the concrete kit may be substantially similar to those described previously. For example, the natural pozzolan contains 35-50 wt % of $SiO_2$, preferably 37-45 wt % of $SiO_2$, more preferably 39-42 wt % of $SiO_2$, or about 40.5 wt % of $SiO_2$, 10-25 wt % of $Fe_2O_3$, preferably 13-22 wt % of $Fe_2O_3$, more preferably 15-19 wt % of $Fe_2O_3$, or about 17.5 wt % of $Fe_2O_3$, 8-18 wt % of CaO, preferably 9-15 wt % of CaO, more preferably 10-13 wt % of CaO, or about 11.8 wt % of CaO, 5-20 wt % of $Al_2O_3$, preferably 8-18 wt % of $Al_2O_3$, more preferably 10-15 wt % of $Al_2O_3$, or about 13 wt % of $Al_2O_3$, each relative to a total weight of the natural pozzolan.

In addition, weight ratios between the components present in the concrete kit may be substantially similar to those mentioned previously. For example, a weight ratio of the natural pozzolan to the ground granulated blast furnace slag in the concrete package is in a range of 1:1 to 20:1, preferably 2:1 to 18:1, preferably 3:1 to 16:1, preferably 4:1 to 15:1, preferably 5:1 to 14:1, preferably 6:1 to 13:1, preferably 7:1 to 12:1, preferably 8:1 to 11:1, preferably 9:1 to 10:1. A weight ratio of the alkali silicate to the alkali hydroxide in the alkali package is in a range of 2:1 to 3:1, preferably 2.1:1 to 2.9:1, preferably 2.2:1 to 2.8:1, preferably 2.3:1 to 2.7:1, preferably 2.4:1 to 2.6:1, or about 2.5:1.

The examples below are intended to further illustrate protocols for preparing, characterizing the alkali activated concrete, and uses thereof, and are not intended to limit the scope of the claims.

Example 1

Precursor Materials

The primary precursor material utilized in the study was a ground form of basaltic rock from red sea coast of Saudi Arabia and ground granulated blast furnace slag (GGBFS) acquired from a local supplier. The chemical compositions of both materials determined by XRF are given in Table 1.

TABLE 1

| Chemical composition of natural pozzolan (NP) and GGBFS | | | | | | | | | |
|---|---|---|---|---|---|---|---|---|---|
| Type | Oxides | $SiO_2$ | $Al_2O_3$ | $Fe_2O_3$ | CaO | MgO | $K_2O$ | $Na_2O$ | $P_2O_5$ |
| Natural Pozzolan | Weight, % | 40.48 | 12.90 | 17.62 | 11.83 | 8.33 | 1.67 | 3.60 | 1.37 |
| GGBFS | Weight, % | 33.32 | 11.82 | 1.045 | 44.57 | — | — | — | — |

Example 2

Alkaline Activators

The alkaline activators used were a combination of aqueous sodium silicate (SS), and 14 M sodium hydroxide (SH) solution. The silica modulus of the sodium silicate was 3.3, and its composition was: $H_2O$: 62.50%, $SiO_2$: 28.75%, and $Na_2O$: 8.75%.

Example 3

Aggregates

Fine aggregate (FA) used was dune sand with a specific gravity of 2.62 in saturated surface dry condition. Crushed lime stone having a specific gravity of 2.56 was used as the coarse aggregate.

Example 4

Mix Design

In order to determine suitable compositions of alkaline activators, trial mixtures were prepared with a SS/SH ratio of 2.0, 2.5, and 2.75, having a combined activator silica modulus of 1.193, 1.367, and 1.444, while the alkali content ($Na_2O$) was 8.435%, 7.888%, and 7.668% of the binder content, respectively. Table 2 shows the material constituents of trial mixtures without GGBFS. Based on the compressive strength results obtained from these trials, the best performing mix was selected and the NP was partially replaced with GGBFS from 10% to 40% by weight to further improve the strength.

TABLE 2

Constituent materials for AAC trial mixtures without GGBFS

| Trial Mix # | Natural pozzolan (NP), kg/m³ | Sodium Silicate (SS), kg/m³ | Sodium Hydroxide (SH), kg/m³ | Total Water, kg/m³ | Total Alkaline Activator, kg/m³ | SS/SH Ratio | Fine Aggregate (FA), kg/m³ | Coarse Aggregate (CA), kg/m³ |
|---|---|---|---|---|---|---|---|---|
| M0-1 | 400 | 140 | 70 | 139.22 | 210 | 2.00 | 650 | 1206 |
| M0-2 | 400 | 150 | 60 | 139.51 | 210 | 2.50 | 650 | 1206 |
| M0-3 | 400 | 154 | 56 | 139.63 | 210 | 2.75 | 650 | 1206 |

Table 3 summarizes the constituent materials for preparing AAC specimens incorporating GGBFS from 0 to 40% by weight. The ratios of coarse aggregate to total aggregate and fine aggregate to total aggregate were 0.65 and 0.35, respectively. A free water to pozzolanic material ratio of 0.25 and alkaline activator to binder ratio of 0.525 was used in all AAC mixtures.

TABLE 3

Constituent materials of AAC mixtures with and without GGBFS

| Mix # | Natural pozzolan (NP), kg/m³ | GGBFS, kg/m³ | Sodium silicate (SS), kg/m³ | Sodium hydroxide (SH), kg/m³ | Fine aggregate (FA), kg/m³ | Coarse aggregate (CA), kg/m³ |
|---|---|---|---|---|---|---|
| M0 | 400 | 0 | 150 | 60 | 650 | 1206 |
| M1 | 360 | 40 | 150 | 60 | 646 | 1200 |
| M2 | 320 | 80 | 150 | 60 | 640 | 1188 |
| M3 | 280 | 120 | 150 | 60 | 630 | 1170 |
| M4 | 240 | 160 | 150 | 60 | 620 | 1152 |

For comparison, ordinary Portland cement concrete specimens incorporating GGBFS were also prepared using material constituents given in Table 4, in which 50% of OPC was replaced with GGBFS.

TABLE 4

Constituent materials of OPC concrete with GGBFS

| Mix # | Cement content, kg/m³ | GGBFS, kg/m³ | Water/Cement ratio | Water, kg/m³ | Fine aggregate (FA), kg/m³ | Coarse aggregate (CA), kg/m³ |
|---|---|---|---|---|---|---|
| M5 | 210 | 210 | 0.40 | 168 | 615 | 1143 |

Example 5

Concrete Mixing and Sample Preparation

The required quantities of sodium silicate and sodium hydroxide were mixed together with the free water prior to the preparation of concrete. Subsequently, coarse and fine aggregates were measured and placed in an approximately 20.0 L capacity Hobart mixer and thoroughly mixed prior to the addition of NP along with GGBFS. Wet mixing followed with the addition of liquid content. Each substance added to the bowl was mixed approximately for three minutes such that the total mixing time was about 8 to 10 minutes to ensure the homogeneity of the mixture. Subsequently, the concrete was placed in the molds in two layers and each layer was vibrated for 30 seconds to remove the entrapped air from the mixture. Then, the surface was carefully smoothened with a trowel to have a smooth finish. After the placement, consolidation, and finishing of the concrete, the specimens were covered with a plastic sheet to prevent moisture loss and kept in a laboratory at a maintained temperature of 23±2° C. for 24 hours before being de-molded.

Example 6

Curing

After 24 hours of casting, the specimens were de-molded, placed in plastic bags to avoid evaporation of moisture and kept in an oven maintained at 60° C. for curing. The OPC concrete with 50% GGBFS was cured under wet burlap.

Example 7

Evaluation Methods

The developed concrete was evaluated by following methods according to ASTM standards.
 i) Unit weight of concrete, according to ASTM 0138 [ASTM C138-10, Standard Test Method for Density (Unit Weight), Yield, and Air Content (Gravimetric) of Concrete, ASTM International, West Conshohocken, Pa., 2010, incorporated herein by reference in its entirety] on 50 mm cube specimens after one day of casting.
 ii) Compressive strength of concrete at ½, 1, 3 and 7, 14 and 28 days of curing at 60° C. according to ASTM C109 [ASTM C109-10, Standard Test Method for Compressive Strength of Hydraulic Cement Mortars, ASTM International, West Conshohocken, Pa., 2010, incorporated herein by reference in its entirety] on 50 mm cubes. In case of OPC concrete compressive strength was determined after 1, 3, 7, 14 and 28 days of wet burlap curing.

Example 8

Unit Weight

Unit weight of concrete determined after 24 hours of casting is given in Table 5. It ranged between 2133 and 2269 kg/m³. The unit weight of AAC was similar to that of OPC-based concrete. The reference concrete mix prepared without GGBFS was also comparable to the Portland cement concrete. These results show that the AAC mixes synthesized in this study were better or similar to the conventional concrete mixes in terms of density.

TABLE 5

Unit weight of various concrete mixes

| Mix # | Side a, mm | Side b, mm | Side c, mm | Wt., gr | Unit Weight kg/m³ | Avg. Unit Weight, kg/m³ |
|---|---|---|---|---|---|---|
| M0 | 50.91 | 50.95 | 54.38 | 313.6 | 2223 | 2242 |
|  | 51.56 | 52.24 | 54.04 | 328.03 | 2254 |  |
|  | 51.15 | 52.57 | 54.64 | 330.54 | 2250 |  |
| M1 | 59.97 | 52.65 | 51.24 | 311.81 | 1927 | 2133 |
|  | 50.88 | 51.07 | 53.9 | 312.25 | 2229 |  |
|  | 51.01 | 51.2 | 54 | 316.08 | 2241 |  |
| M2 | 50.89 | 51.1 | 53.65 | 314.6 | 2255 | 2263 |
|  | 52.85 | 51.41 | 51.56 | 319.79 | 2283 |  |
|  | 50.66 | 53.06 | 50.19 | 303.55 | 2250 |  |
| M3 | 50.45 | 52.31 | 53.78 | 318.62 | 2245 | 2243 |
|  | 50.09 | 52.12 | 53.87 | 319.11 | 2269 |  |
|  | 51.12 | 52.45 | 53.65 | 318.65 | 2215 |  |
| M4 | 52.74 | 51.18 | 53.08 | 323.39 | 2257 | 2269 |
|  | 51.5 | 51.56 | 53.65 | 327.68 | 2300 |  |
|  | 50.84 | 50.71 | 54.66 | 316.91 | 2249 |  |
| OPC | 50.34 | 52.16 | 52.87 | 321.79 | 2318 | 2240 |
|  | 51.24 | 52.34 | 53.67 | 317.46 | 2206 |  |
|  | 51.06 | 52.45 | 53.65 | 315.7 | 2197 |  |

Example 9

Effect of SS/SH Ratio on the Compressive Strength

FIG. 1 shows the compressive strength data in the AAC mixes prepared with a SS/SH ratio of 2.00, 2.50, and 2.75, respectively. The strength development was steady up to 7 days of curing in all three mixes. It was higher in the mixture prepared with a SS/SH ratio of 2.5 at the onset of curing and continued to increase as the curing progressed up to 7 days in comparison to the other two mixtures. For instance, the one-day strength in the mixture prepared with SS; SH ratio of 2.5 was 23.92 MPa, about 150% more than that of the other two mixes prepared with a SS/SH ratio of 2.0 and 2.75, each having a one-day strength of 9.58 MPa and 9.68 MPa, respectively. A maximum strength of 37.52 MPa was measured in the specimens prepared with a SS/SH ratio of 2.5 after 7 days of curing, while the maximum strength was 35.22 MPa and 32.28 MPa for the mixes prepared with a SS/SH ratio of 2.0 and 2.75, respectively. Therefore, a SS/SH ratio of 2.5 by weight and 7 days of curing was found to be suitable for achieving superior strength in the trial mixes.

Example 10

Influence of Incorporating GGBFS on the Compressive Strength

Evaluation on compressive strength of the binary green concrete derived from natural pozzolan and blast furnace slag as well as conventional concrete (UPC) at different curing periods is demonstrated in FIG. 2. According to the test results, compressive strength of different mixes increased with longer curing period. For a particular curing period, compressive strength of the concrete increased with increasing GGBFS content in the green concrete mixes. In addition, green concrete mix prepared without GGBFS exhibited lower compressive strength compared to the ones prepared with GGBFS. For the green concrete mixes, particularly those synthesized by partially replacing NP with GGBFS, strength gain after 12 hours of curing was higher compared to the conventional concrete. The cube compressive strength measured in these mixes, namely M0, M1, M2, M3, and M4 after 12 hours of curing was 12.57, 27.24 MPa, 38.12 MPa, 61.11 MPa, 62.69 MPa, respectively. The compressive strength gain in the green concrete mixes containing 30 to 40% GGBFS was remarkably higher. The early-stage high strength observed in these concrete mixes as compared to OPC-based concrete shows the advantage of utilizing them in a precast concrete industry setting where early strength gain determines the demolding period. Overall, green concrete mixes prepared with 60% to 70% natural pozzolan and 30% to 40% GGBFS exhibited remarkable strength gain after only 12 hours of curing. The compressive strength measured in these mixes was above 60 MPa, which is quite high as compared to that of the conventional concrete at 16.77 MPa after 1 day of curing. Therefore, compressive strength results obtained from currently disclosed concrete mixes demonstrated that utilizing these mixes, particularly those having 60% to 70% natural pozzolan and 30% to 40% blast furnace slag in the precast concrete industry or any ready mix batching plants, the demolding time could be reduced. A shortened demolding time will help to lower the cost and increase the production of plant significantly.

Example 11

Advantages and Limitations

To determine the right composition of alkaline activators, trial mixes were conducted with a ratio of sodium silicate to sodium hydroxide ranging from 2.0 to 2.75. In order to improve concrete properties, NP was partially replaced with ground granulated blast furnace slag (GGBFS) in the trial mixture to obtain superior strength. Experimental work was designed to determine the optimum composition by varying the quantity of GGBFS in the mixture. Compressive strength development of concrete was monitored using specimens cured at 60° C. A sodium silicate to sodium hydroxide ratio of 2.5 in the trials conducted achieved better mechanical strength after 7 days of heat curing. Further, the results have shown that there was significant strength gain in all the concrete mixes prepared by partially replacing NP with GGBFS at the onset of curing as early as 12 hours in the mixes. The compressive strength gain was proportional to the quantity of G-GBFS in the mixture. Importantly, compressive strength of concrete prepared with 60 to 70% of natural pozzolan and 30% to 40% G-GBFS exhibited remarkable enhancement in strength compared to concretes prepared at other replacement level. Concrete containing such combination gained more than 60 MPa of compressive strength after 12 hours of heat curing, which is remarkably higher than the minimum strength required in the precast concrete industry.

Following are some of the advantages of the developed concrete mixtures:
  i. Environmentally friendly concrete produced by totally replacing OPC.
  ii. Reduction in greenhouse gas emissions associated with the production of OPC.
  iii. Produced utilizing source materials naturally available such as natural pozzolan.
  iv. Reduction in the energy consumption.
  v. Developed concrete could be potentially utilized for structural applications.
  vi. High early strength.
  vii. The added advantage of the developed concrete mixtures is that; it is expected to perform well in terms of durability.
  viii. Reduction in the maintenance cost of structures.

It is worth noting that the source materials utilized in developing concrete in this case such as NP shall meet the ASTM C618 requirements. Furthermore, the strength development of the concrete is sensitive to the concentration of alkaline materials.

The invention claimed is:

1. An alkali activated concrete composition, comprising:
a natural pozzolan;
a ground granulated blast furnace slag;
an alkali activator comprising an alkali hydroxide and an alkali silicate,
wherein:
the natural pozzolan comprises 35-50 wt % of $SiO_2$, 10-25 wt % of $Fe_2O_3$, 5-15 wt % of $Al_2O_3$, and 8-15 wt % of CaO, each relative to a total weight of the natural pozzolan;
the ground granulated blast furnace slag comprises 30-35 wt % of $SiO_2$, 0.5-5 wt % of $Fe_2O_3$, 10-12 wt % of $Al_2O_3$, and 40-50 wt % of CaO, each relative to a total weight of the ground granulated blast furnace slag;
a weight ratio of the natural pozzolan to the ground granulated blast furnace slag is in a range of 1:1 to 20:1;
a weight ratio of the alkali silicate to the alkali hydroxide is in a range of 2:1 to 3:1; and
the alkali activated concrete composition is devoid of fly ash.

2. The alkali activated concrete composition of claim 1, wherein the alkali hydroxide is sodium hydroxide.

3. The alkali activated concrete composition of claim 1, wherein the alkali silicate is sodium silicate.

4. The alkali activated concrete composition of claim 1, further comprising a fine aggregate and a coarse aggregate.

5. The alkali activated concrete composition of claim 4, wherein the fine aggregate comprises sand having a specific gravity of 2.2-3.2.

6. The alkali activated concrete composition of claim 4, wherein the coarse aggregate comprises crushed limestone having a specific gravity of 2.1-3.0.

7. The alkali activated concrete composition of claim 1, wherein the weight ratio of the natural pozzolan to the ground granulated blast furnace slag is in a range of 1:1 to 4:1.

8. The alkali activated concrete composition of claim 1, wherein the weight ratio of the alkali silicate to the alkali hydroxide is in a range of 2.4:1 to 2.7:1.

9. The alkali activated concrete composition of claim 4, which has a weight percentage of the natural pozzolan ranging from 8-20% relative to a total weight of the alkali activated concrete composition.

10. The alkali activated concrete composition of claim 4, which has a weight percentage of the ground granulated blast furnace slag ranging from 0.4-15% relative to a total weight of the alkali activated concrete composition.

11. The alkali activated concrete composition of claim 4, which has a weight percentage of the alkali silicate ranging from 5-10% relative to a total weight of the alkali activated concrete composition.

12. The alkali activated concrete composition of claim 4, which has a weight percentage of the alkali hydroxide ranging from 1.5-5% relative to a total weight of the alkali activated concrete composition.

13. The alkali activated concrete composition of claim 4, wherein a weight ratio of the coarse aggregate to the fine aggregate is in a range of 3:1 to 1:1.

14. The alkali activated concrete composition of claim 4, consisting essentially of:
the natural pozzolan;
the ground granulated blast furnace slag;
the alkali hydroxide;
the alkali silicate;
the fine aggregate; and
the coarse aggregate,
wherein:
a weight ratio of the natural pozzolan to the ground granulated blast furnace slag is in a range of 1:1 to 20:1; and
a weight ratio of the alkali silicate to the alkali hydroxide is in a range of 2:1 to 3:1.

15. A wet concrete slurry, comprising:
the alkali activated concrete composition of claim 4; and
water,
wherein a weight ratio of the water to the alkali activated concrete composition is in a range of 1:5 to 1:25.

16. An alkali activated concrete, comprising the wet concrete slurry of claim 15 in a cured form.

17. The alkali activated concrete of claim 16, which has a 24-hour unit weight of 2,100-2,400 kg/m$^3$ as determined by ASTM C138.

18. The alkali activated concrete of claim 16, which has a 12-hour compressive strength of 25-70 MPa as determined by ASTM C109 when cured at 30-60° C.

19. A method of producing the alkali activated concrete of claim 16, the method comprising:
casting the wet concrete slurry in a mold to form a casted wet concrete; and
curing the casted wet concrete for 0.5-30 days thereby forming the alkali activated concrete.

20. A two-component concrete kit, comprising:
a concrete package comprising:
a natural pozzolan;
a ground granulated blast furnace slag;
a fine aggregate comprising sand; and
a coarse aggregate comprising crushed limestone, and
an alkali package comprising an alkali hydroxide and an alkali silicate,
wherein:
the natural pozzolan comprises 35-50 wt % of $SiO_2$, 10-25 wt % of $Fe_2O_3$, 5-15 wt % of $Al_2O_3$, and 8-15 wt % of CaO, each relative to a total weight of the natural pozzolan;
the ground granulated blast furnace slag comprises 30-35 wt % of $SiO_2$, 0.5-5 wt % of $Fe_2O_3$, 10-12 wt % of $Al_2O_3$ and 40-50 wt % of CaO, each relative to a total weight of the ground granulated blast furnace slag;
a weight ratio of the natural pozzolan to the ground granulated blast furnace slag is in a range of 1:1 to 20:1; and
a weight ratio of the alkali silicate to the alkali hydroxide is in a range of 2:1 to 3:1.

* * * * *